United States Patent
Harris

(10) Patent No.: US 7,181,112 B2
(45) Date of Patent: Feb. 20, 2007

(54) THREE COLOR DIGITAL GOBO SYSTEM

(75) Inventor: Jeremiah J. Harris, Las Vegas, NV (US)

(73) Assignee: Production Resource Group, L.L.C., New Windsor, NY (US)

( * ) Notice: Subject to any disclaimer, the term of this patent is extended or adjusted under 35 U.S.C. 154(b) by 0 days.

(21) Appl. No.: 11/386,194

(22) Filed: Mar. 21, 2006

(65) Prior Publication Data

US 2006/0177185 A1  Aug. 10, 2006

Related U.S. Application Data

(63) Continuation of application No. 10/995,612, filed on Nov. 22, 2004, now Pat. No. 7,020,370, which is a continuation of application No. 10/616,481, filed on Jul. 8, 2003, now Pat. No. 6,823,119, which is a continuation of application No. 09/771,953, filed on Jan. 29, 2001, now Pat. No. 6,588,944.

(51) Int. Cl.
- G02B 6/44 (2006.01)
- G02B 26/00 (2006.01)
- G09F 13/00 (2006.01)

(52) U.S. Cl. ............ 385/100; 385/115; 385/116; 385/88; 385/147; 385/901; 359/291; 362/232; 362/551; 362/556

(58) Field of Classification Search ............ 385/88, 385/89, 92, 49, 115, 116, 14, 147, 901, 37, 385/100; 359/291, 223, 224; 382/217, 220, 382/190; 348/241, 239, 246; 362/232, 551, 362/556, 293, 296

See application file for complete search history.

(56) References Cited

U.S. PATENT DOCUMENTS

| | | | |
|---|---|---|---|
| 5,053,765 A | 10/1991 | Sonehara et al. | 340/815.31 |
| 5,774,174 A * | 6/1998 | Hardie | 348/38 |
| 5,828,485 A | 10/1998 | Hewlett | 339/291 |
| 5,940,204 A | 8/1999 | Hewlett | 359/298 |
| 6,057,958 A | 5/2000 | Hunt | 359/291 |
| 6,188,933 B1 | 2/2001 | Hewlett et al. | 700/19 |
| 6,208,087 B1 | 3/2001 | Hughes et al. | 315/291 |
| 6,256,136 B1 | 7/2001 | Hunt | 359/291 |
| 6,538,797 B1 | 3/2003 | Hunt | 359/291 |
| 6,588,944 B2 | 7/2003 | Harris | 385/88 |
| 6,617,792 B2 | 9/2003 | Hughes et al. | 315/32 |
| 6,823,119 B2 | 11/2004 | Harris | 385/100 |
| 6,891,656 B2 | 5/2005 | Hunt | 359/291 |
| 2002/0181070 A1* | 12/2002 | Hewlett | 359/291 |
| 2005/0100289 A1* | 5/2005 | Harris | 385/88 |
| 2006/0177185 A1* | 8/2006 | Harris | 385/100 |

* cited by examiner

*Primary Examiner*—Brian M. Healy
(74) *Attorney, Agent, or Firm*—Fish & Richardson P.C.

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

45 Claims, 2 Drawing Sheets

THREE COLOR DIGITAL GOBO SYSTEM

CROSS-REFERENCE TO RELATED APPLICATIONS

This application is a continuation application of and claims priority to U.S. application Ser. No. 10/995,612, filed Nov. 22, 2004, now U.S. Pat. No. 7,020,370, which is a continuation of U.S. application Ser. No. 10/616,481, filed Jul. 8, 2003, now U.S. Pat. No. 6,823,119, which is a continuation of U.S. application Ser. No. 09/771,953, filed Jan. 29, 2001, now U.S. Pat. No. 6,588,944.

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
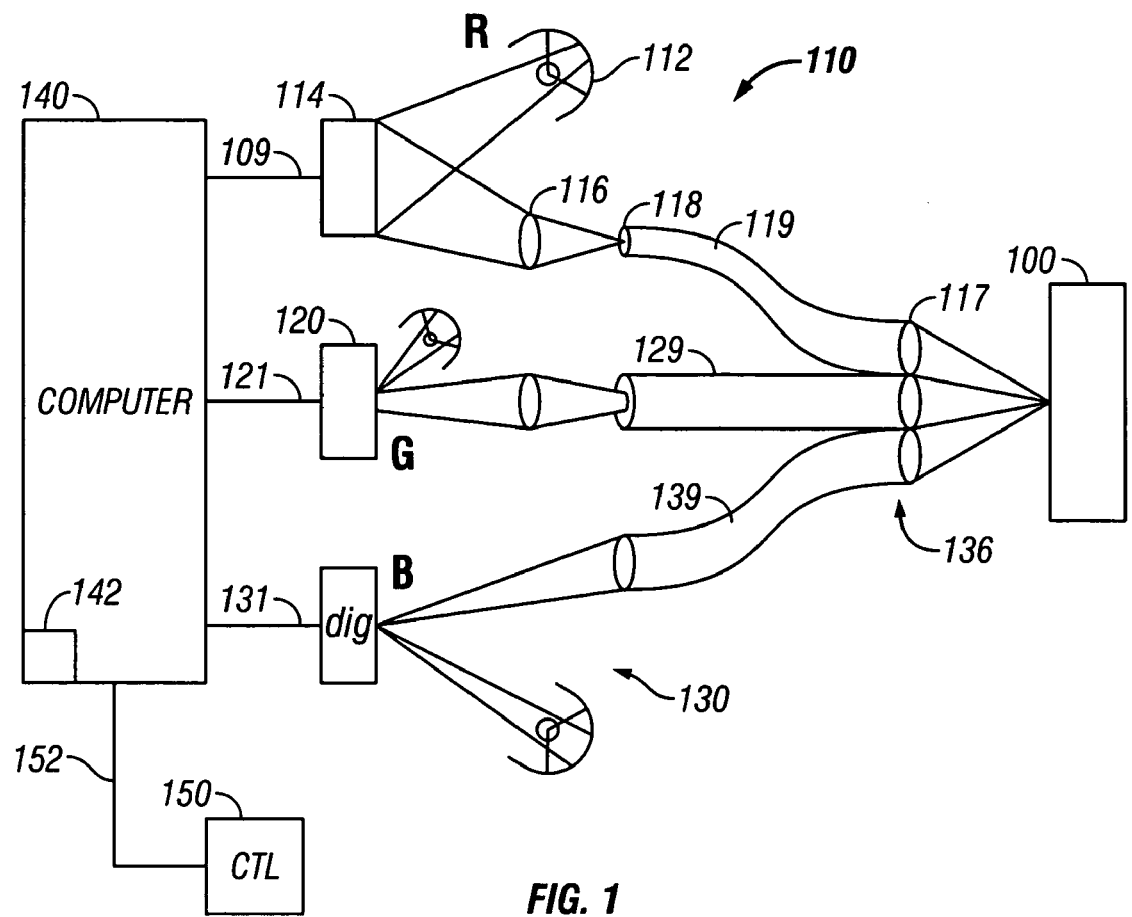
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117, and coupled towards the object 100. Analogously, the other lighting unit 120 focuses its light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
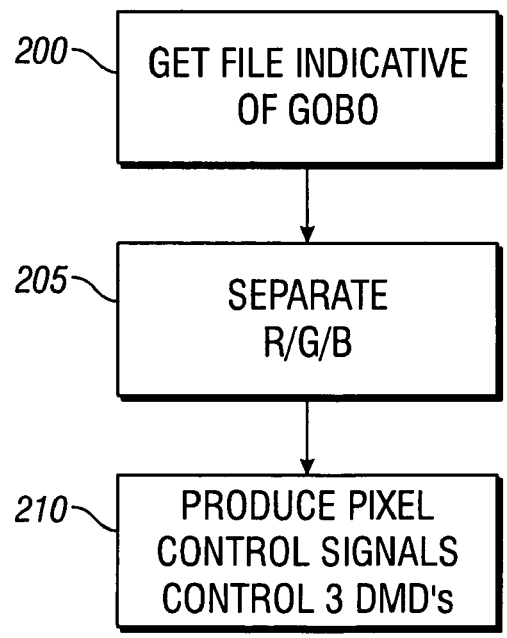
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
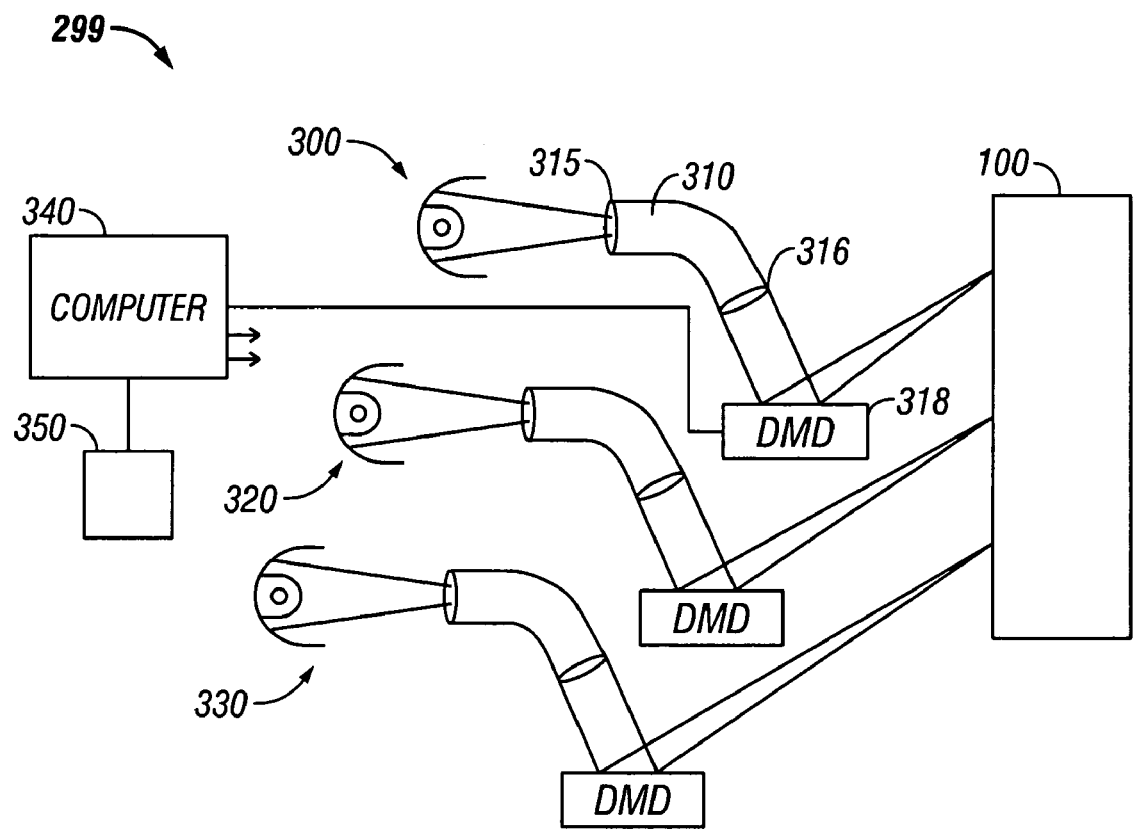
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
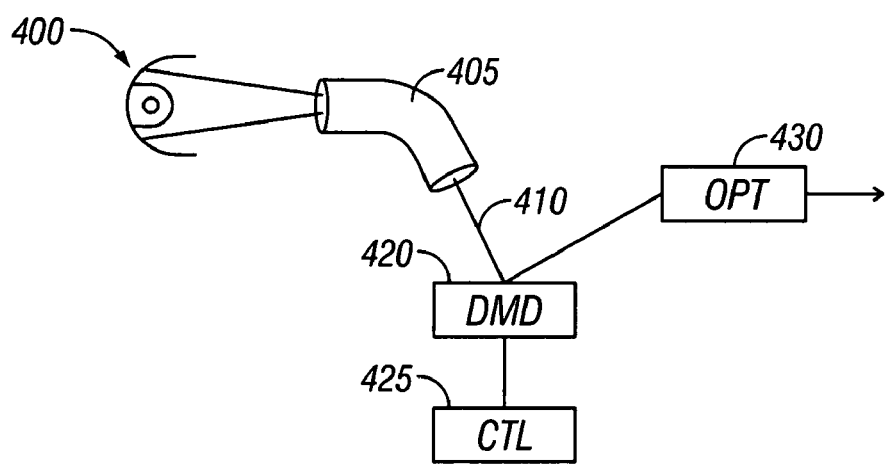
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A method, comprising: obtaining an electronic file representative of a color gobo shape;
dividing said electronic file into a first part representative of a first part of the color gobo shape, and into a second part representative of a second part of the color gobo shape, where the first part and second parts collectively represent a complete color gobo shape; and
using said first part to control a first part of shaping a light according to the color gobo shape, and using said second part to control a second part of shaping the light according to the color gobo shape.

2. A method as in claim 1, wherein said first part is a first color component of the light shaping by the color gobo shape, and said second part is a second color component of the light shaping by the color gobo shape.

3. A method as in claim 1, further comprising dividing said electronic file into an additional third part representative of a third part of the color gobo shape.

4. A method as in claim 3, wherein said first part is a first color component, said second part is a second color component, and said third part is a third color component of the light shaping by the color gobo shape.

5. A method as in claim 4, wherein said colors components are red, green and blue respectively.

6. A method as in claim 4, wherein said color components are cyan magenta and yellow respectively.

7. A method as in claim 1, wherein said using comprises digitally controlling shaping of the light.

8. A method as in claim 1, wherein said using comprises digitally controlling shaping the light in separate digitally controllable pixel level light shape altering devices.

9. A method as in claim 1, wherein said obtaining an electronic file comprises using a computer to process a digital file which is stored in said computer.

10. A method as in claim 8, further comprising using said digitally controllable pixel light shape altering devices to shape at least one beam of light.

11. A method, comprising:
forming first and second electronic files, respectively indicative of first and second component parts, which first and second component parts collectively represent a color gobo that defines shaping of an outer perimeter of a beam of light, and that defines a color within the shaped outer perimeter; and
using both said first and second component parts to form the color gobo in the specified shape with the shaped outer perimeter, and with the defined color within the shaped outer perimeter, further comprising forming a third electronic file indicative of a third component part, and where said first, second and third component parts collectively represent the color gobo, and wherein said using comprises using all of the first, second and third component parts to form the color gobo.

12. A method as in claim 11, wherein said using comprises applying the first component part to a first digitally controllable light shape altering device, applying the second component part to a second digitally controllable light shape altering device.

13. A method as in claim 12, further comprising applying a first light beam to said first digital light shape altering device, applying a second light beam to said second digital light shape altering device, and combining outputs of said first and second light shape altering devices to form the color gobo.

14. A method as in claim 11, wherein said first and second component parts represent different color components of the color gobo.

15. A method, comprising:
forming first and second electronic files, respectively indicative of first and second component parts, which first and second component parts collectively represent a color gobo that defines shaping of an outer perimeter of a beam of light, and that defines a color within the shaped outer perimeter; and
using both said first and second component parts to form the color gobo in the specified shape with the shaped outer perimeter, and with the defined color within the shaped outer perimeter, wherein said forming comprises obtaining an electronic file indicative of a color gobo, and separating said electronic file into said first and second component parts.

16. A method, comprising:
separately shaping outer perimeters of each of first and second separate light beams; and
combining said first and second light beams with shaped outer perimeters into a composite light beam, wherein said combining comprises using a fiber-optic device to combine said light beam.

17. A method, comprising:
separately shaping outer perimeters of each of first and second separate light beams; and
combining said first and second light beams with shaped outer perimeters into a composite light beam, wherein said shaping comprises shaping said outer perimeters according to first and second component files, which first and second component files collectively represent a color gobo that shapes the outer perimeter of a beam of light and colors a section within said shaped outer perimeter.

18. A method as in claim 17, wherein said shaping comprises obtaining a file indicative of a color gobo, and separating said file into said first and second component files.

19. A method as in claim 18, wherein said first and second component files respectively represent primary color portions of the color gobo.

20. A method as in claim 16, further comprising using a first light source to create said first light beam and using a second light source to create said second light beam.

21. A method, comprising:
obtaining a color gobo electronic file representing a color gobo;
using said color gobo electronic file to form first, second and third electronic files, respectively indicative of first, second and third component parts, which first, second and third component parts collectively represent a color gobo that defines a shape of an outer perimeter of a beam of light, and that defines at least one color within the shaped outer perimeter;
obtaining first, second and third light beams;
separately shaping outer perimeters of each of said first, second and third light beams; and
combining said first, second and third light beams with shaped outer perimeters into a composite light beam.

22. A method as in claim 21, wherein said first, second and third light beams are each in different primary colors.

23. An apparatus, comprising:
a computer, obtaining an electronic file representative of a color gobo shape, and dividing said electronic file into a first part representative of a first part of the color gobo shape, and into a second part representative of a second part of the color gobo shape, where the first part and second parts collectively represent a complete color gobo shape; and
an optical part, using said first part to control a first part of shaping a light according to the color gobo shape, and using said second part to control a second part of shaping the light according to the color gobo shape.

24. An apparatus as in claim 23, wherein said first part is a first color component of the light shaping by the color gobo shape, and said second part is a second color component of the light shaping by the color gobo shape.

25. An apparatus as in claim 23, wherein said computer further divides said electronic file into an additional third part representative of a third part of the color gobo shape.

26. An apparatus as in claim 25, wherein said first part is a first color component, said second part is a second color component, and said third part is a third color component of the light shaping by the color gobo shape.

27. An apparatus as in claim 26, wherein said color components are red, green and blue respectively.

28. An apparatus as in claim 26, wherein said color components are cyan magenta and yellow respectively.

29. An apparatus as in claim 23, wherein said optical part includes a first digitally controllable light shape altering device, controlled by said first part, and a second digitally controllable light shape altering device, controlled by said second part.

30. An apparatus as in claim 25, wherein said optical part includes a first digitally controllable light shape altering device, controlled by said first part, and a second digitally controllable light shape altering device, controlled by said second part and a third digitally controllable light shape altering device, controlled by said third part.

31. An apparatus as in claim 30, further comprising three light sources, producing light in each of three primary colors.

32. An apparatus, comprising:
sa computer, operating to form first and second electronic files, respectively indicative of first and second component parts, which first and second component parts collectively represent a color gobo that defines shaping of an outer perimeter of a beam of light, and that defines a color within the shaped outer perimeter; and
an optical system, receiving said first and second electronic files, and forming the color gobo in the specified shape with the shaped outer perimeter, and with the defined color within the shaped outer perimeter based on said first and second optical files.

33. An apparatus as in claim 32, wherein said computer further forms a third electronic file indicative of a third component part, and where said first, second and third component parts collectively represent the color gobo, and wherein said is responsive to each of the first, second and third electronic files to form the color gobo.

34. An apparatus as in claim 32, wherein said optical system comprises a first digital light shape altering device receiving said first electronic file, and a second digital light shape altering device receiving the second electronic file.

35. An apparatus as in claim 34, wherein said digital light shape altering devices are digital mirror devices.

36. An apparatus as in claim 34, further comprising a first light source, applying a first light beam to said first digital light shape altering device, and a second light source applying a second light beam to said second digital light shape altering device, and an optical combiner, combining outputs of said first and second light shape altering devices to form the color gobo.

37. An apparatus as in claim 36, wherein said first light source produces a first color light, and said second light source produces a second color light.

38. An apparatus as in claim 32, wherein said computer processes an electronic file indicative of a color gobo to form said first and second component parts representative of primary color portions within said electronic file.

39. An apparatus, comprising: first and second light sources, producing first and second separate light beams;

first and second electronically controllable gobo devices, each separately shaping outer perimeters of each of first and second separate light beams; and a combiner, combining said first and second light beams with shaped outer perimeters into a composite light beam.

40. An apparatus as in claim 39, further comprising a third light source, forming a third light beam, and a third electronically controllable gobo device, separately shaping said outer perimeter of said third light beam, and wherein said combiner combines said first, second and third light beams.

41. An apparatus as in claim 39, wherein said first and second light beams are of different colors.

42. An apparatus as in claim 39, wherein said combiner comprises a fiber-optic device.

43. An apparatus as in claim 39, wherein said first and second light sources produce light of different primary colors.

44. An apparatus, comprising:

a computer that stores a color gobo electronic file representing a color gobo and operates using said color gobo electronic file to form first, second and third electronic files, respectively indicative of first, second and third component parts, which first, second and third component parts collectively represent a color gobo that defines a shape of an outer perimeter of a beam of light, and that defines at least one color within the shaped outer perimeter;

first, second and third light sources, respectively producing first, second and third light beams;

first, second and third electronically controllable gobos, separately shaping outer perimeters of each of said first, second and third light beams based on said first, second and third electronic files; and a combiner that combines said first, second and third light beams with shaped outer perimeters into a composite light beam.

45. An apparatus as in claim 44, wherein said first, second and third light beams are each in different primary colors.

* * * * *